United States Patent

Ohkubo et al.

[11] Patent Number: 5,583,711
[45] Date of Patent: Dec. 10, 1996

[54] GREATER CAPACITY WRITING METHOD FOR A BELT-DRIVEN TAPE CARTRIDGE OR THE LIKE

[75] Inventors: Hiroshi Ohkubo, Fussa; Shinzi Umehara, Kodaira; Mitsuru Hasegawa, Komae; Mitsutoshi Kondo, Chofu; Yoshiaki Sakai, Higashikurume, all of Japan

[73] Assignee: TEAC Corporation, Tokyo, Japan

[21] Appl. No.: 391,617

[22] Filed: Feb. 21, 1995

Related U.S. Application Data

[63] Continuation of Ser. No. 992,493, Dec. 17, 1992, abandoned.

[30] Foreign Application Priority Data

Dec. 24, 1991 [JP] Japan .................. 3-356408

[51] Int. Cl.⁶ .................................. G11B 15/48
[52] U.S. Cl. .................. 360/74.5; 360/74.1; 360/134
[58] Field of Search ..................... 360/74.5, 74.1, 360/74.3, 73.04, 70, 71, 72.3, 134

[56] References Cited

U.S. PATENT DOCUMENTS 3,692,255  9/1972  Von Behren .................. 242/192
4,121,264  10/1978  Kishi et al. .................. 360/27 X
4,492,993  1/1985  Otis .................. 360/74.5
4,851,940  7/1989  Saito .................. 360/107

*Primary Examiner*—Aristotelis Psitos
*Assistant Examiner*—Alan Faber
*Attorney, Agent, or Firm*—Woodcock Washburn Kurtz Mackiewicz & Norris

[57] ABSTRACT

A method of writing on a two-reel, belt driven, multitrack tape cartridge wherein tape tension increases with the progress of tape transportation from one reel to another. Forward tracks on the tape are predivided into a first group adjacent the tape centerline and a second group adjacent one tape edge, and reverse tracks are similarly predivided into a first and a second group. Writing on each of the first group of forward tracks is started in a position spaced a less distance from the tape beginning than on each of the second group of forward tracks. Writing on each of the first group of reverse tracks is also started in a position spaced a less distance from the tape end than on each of the second group of reverse tracks. Thus the tape offers a greater storage capacity than if, as is conventional in the art, writing on the first groups of forward and reverse tracks is started in the same longitudinal tape position as on the second groups of forward and reverse tracks.

2 Claims, 3 Drawing Sheets

FIG. 3
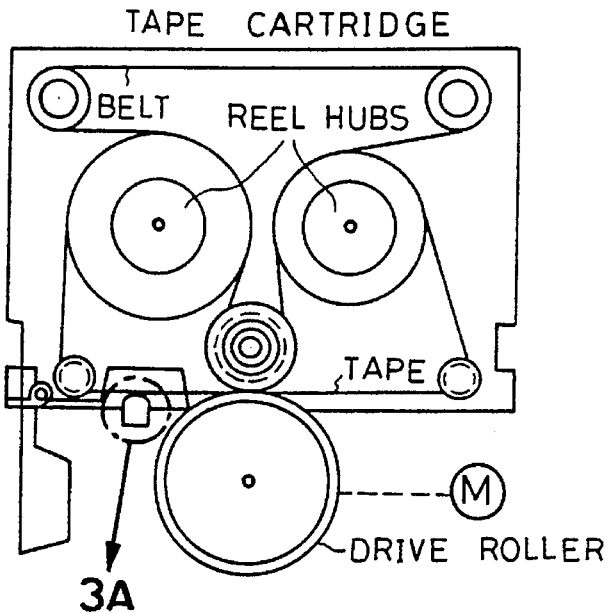
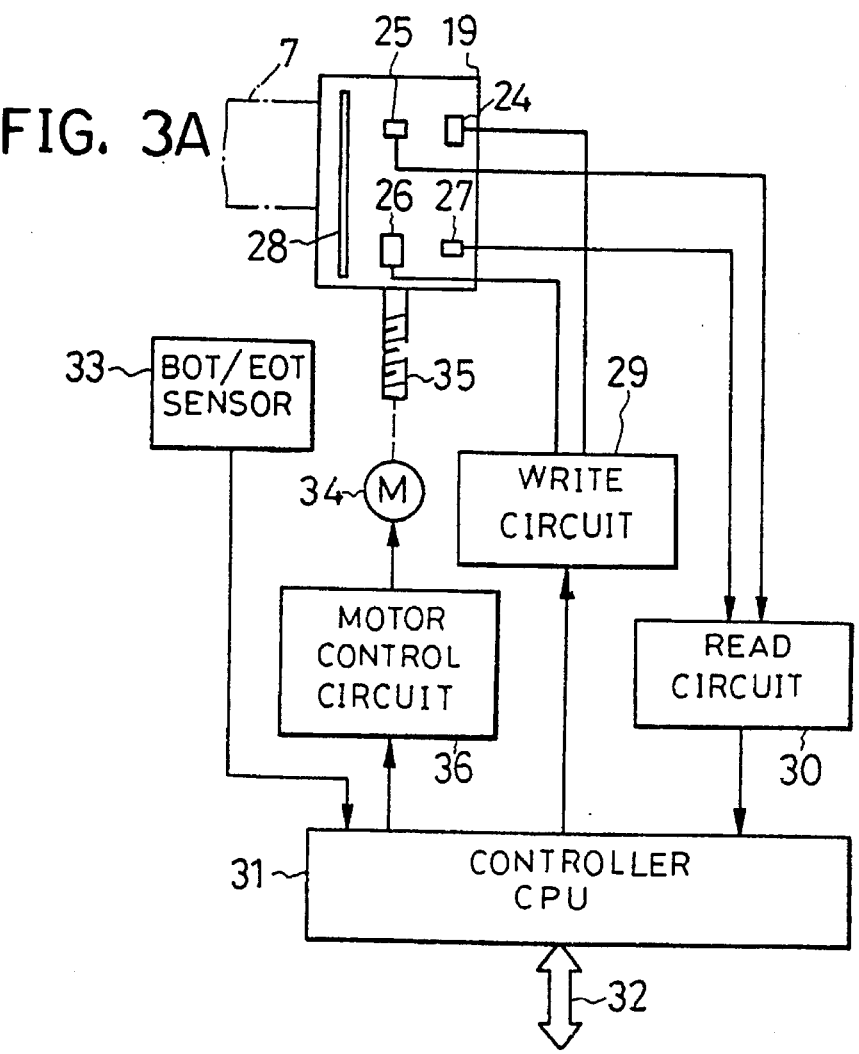
FIG. 3A

GREATER CAPACITY WRITING METHOD FOR A BELT-DRIVEN TAPE CARTRIDGE OR THE LIKE

This is a continuation of application Ser. No. 07/992,493, filed Dec. 17, 1992, now abandoned.

BACKGROUND OF THE INVENTION

This invention relates to a method of writing data on a length of multitrack magnetic tape in tape transports used as peripheral devices of computer systems, and to such a tape itself on which data is written in accordance with the invention. The writing method of this invention has particular utility with two-reel, belt driven, multitrack tape cartridges of the type disclosed in U.S. Pat. No. 3,692,255 filed by Behren and assigned to Minnesota Mining and Manufacturing Company, of Minn., the United States, although it is not desired that the invention be limited to this particular type of tape.

The two-reel tape cartridge according to Behren employs a flexible belt for driving the tape between a pair of reel hubs. The belt extends along a belt guide path around guide rollers adjacent the reel hubs and a driving roller therebetween and contacts the tape on the reel hubs. The rotation of the driving roller causes the belt to frictionally drive the tape reels to tension the tape and to move the tape between the reels. The cartridge construction offers the advantages of low power bidirectional drive and rapid acceleration and deceleration of the tape by a single reversible drive motor.

A problem with the above and other comparable tape cartridges is that, as has proved by measurement, the tension of the tape at its portion adjacent the transducer rises linearly as it travels from the beginning toward the end, and back from the end toward the beginning, of the tape. Reasons for such linear variations in tape tension are not necessarily clear, but it seems most reasonable to ascribe them to varying tape diameters on the reel hubs.

Thus, regardless of whether the tape is driven forwardly or reversely, the tape tension is too low for error-free writing or reading immediately after it has started traveling from its beginning or end. A conventional solution to this problem was to start writing on each of the tracks in a longitudinal tape position where the tape tension had built up sufficiently high. This solution is unsatisfactory because not the full tape length is utilized for data storage.

SUMMARY OF THE INVENTION

The present invention aims at the maximum possible use of the tape for data storage in the two-reel, belt driven tape cartridge and other types of tape media subject to varying tension along their lengths.

Briefly, the invention concerns, in a tape transport for use with a two-reel, multitrack tape cartridge wherein the tension of magnetic tape traveling past a transducer increases from the beginning toward the end of the tape, a method of writing data on the tape along a plurality of tracks extending longitudinally of the tape. The method comprises predividing the tracks on the tape into a first group adjacent a longitudinal centerline of the tape and a second group adjacent either longitudinal edge of the tape. Writing is started along each of the first group of tracks in a first position spaced a first predetermined distance from the beginning of the tape, and along each of the second group of tracks in a second position spaced a second predetermined distance from the tape beginning. The first distance is less than the second distance.

Thus, according to the method of this invention, the starting positions of the first track group are closer to the tape beginning than are those of the second track group. By the term "beginning of the tape" is meant not only the actual beginning of the tape but also the beginning of the magnetized zone of the tape or the position of a standard beginning-of-tape mark or any other mark at or adjacent the tape beginning.

The midpart of the tape with respect to its transverse direction is far less susceptible to destruction or deformation, and so makes better contact with the head, than its longitudinal edge portions in the belt driven and other types of tape cartridges. Writing or reading with little or no errors is therefore possible if the starting positions of the first track group, positioned adjacent the tape centerline, are brought closer to the tape beginning than heretofore, despite the low tape tension. The storage capacity of the tape can thus be increased by an amount proportional with the extent to which the first track group is made longer than heretofore.

In a preferred embodiment, in which the invention is applied to a bidirectional tape transport, not only the forward tracks but also the reverse tracks are predivided into a first group adjacent the tape centerline and a second group adjacent either longitudinal tape edge. Just as the starting positions of the first group of forward tracks are made closer to the tape beginning than are those of the second group of forward tracks, so the starting positions of the first group of reverse tracks are closer to the tape end than are those of the second group of reverse tracks.

The above and other features and advantages of this invention and the manner of realizing them will become more apparent, and the invention itself will best be understood, from a study of the following description and appended claims, with reference had to the attached drawings showing the best mode of carrying out the invention.

BRIEF DESCRIPTION OF THE DRAWINGS

FIG. 3 is a block diagram of a tape transport suitable for use in writing data on the tape of FIGS. 1 and 2 by the method of this invention.

DETAILED DESCRIPTION OF THE INVENTION

Figure 1:
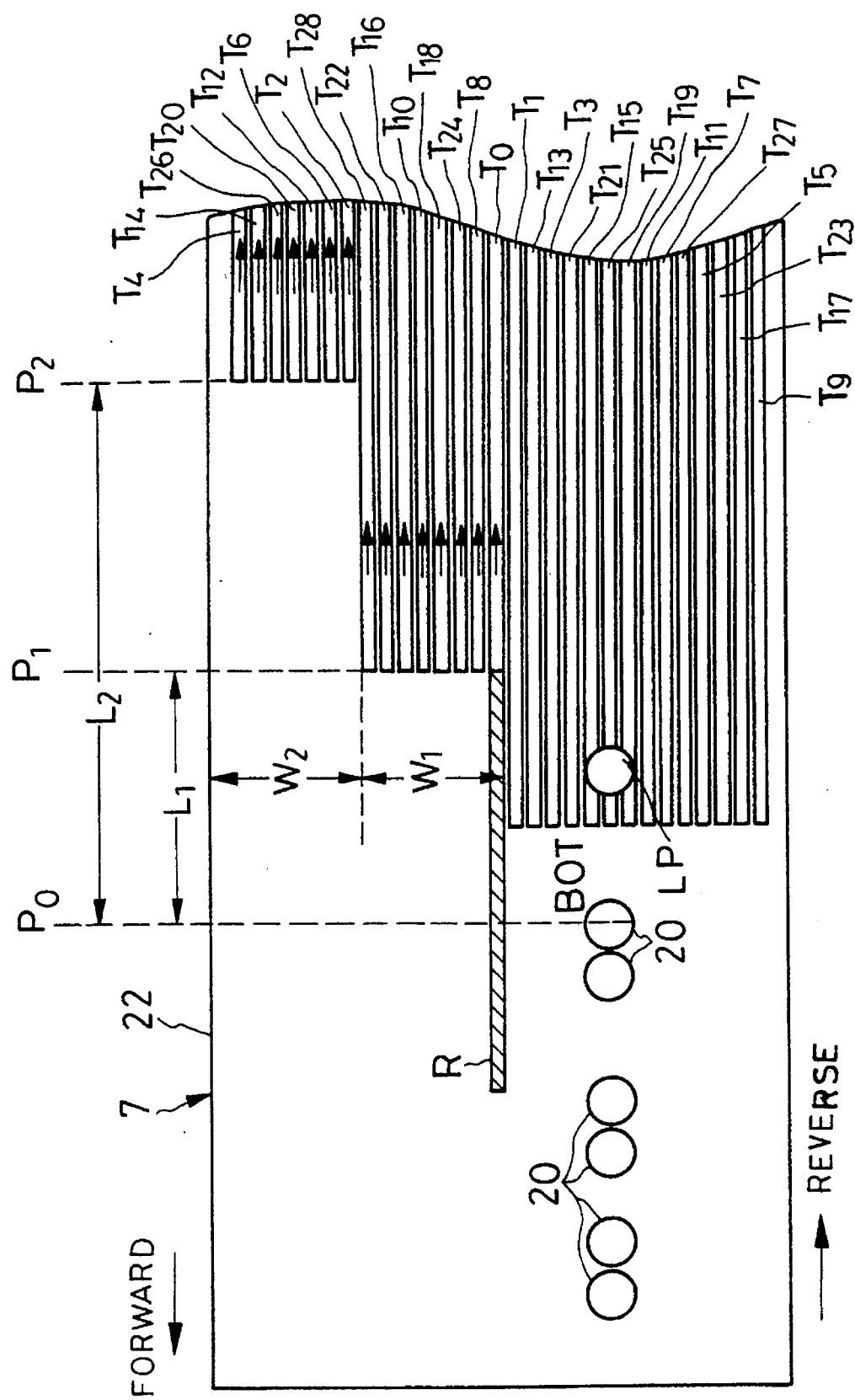
FIG. 1 is a plan view of the beginning portion of bidirectional, multitrack magnetic tape on which data is written by the method of this invention.
Figure 2:
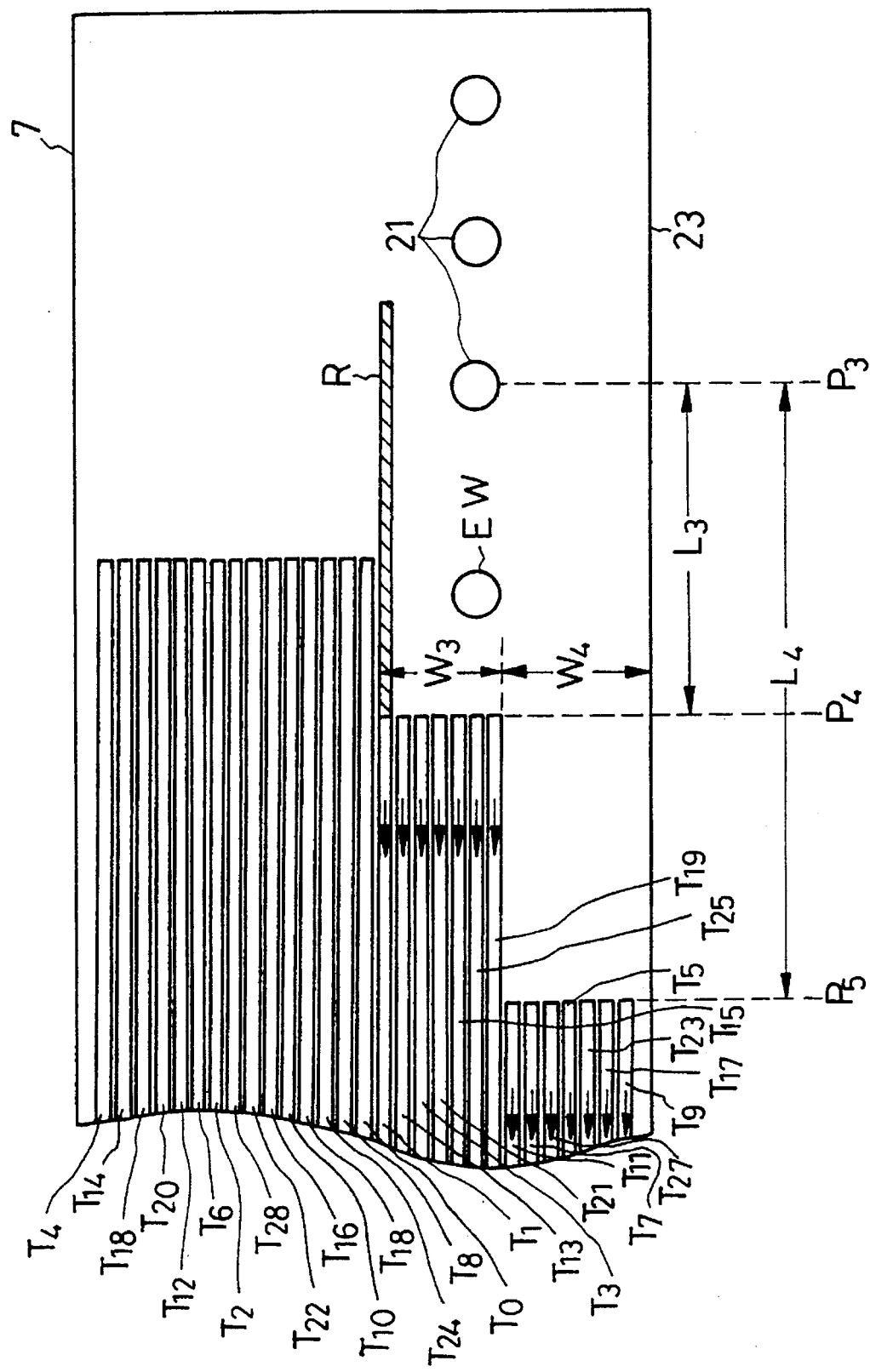
FIG. 2 is a plan view of the end portion of the tape of FIG. 1.

The writing method of this invention will now be described in detail as applied to the two-reel, belt driven tape cartridge of the prior art construction discussed previously. FIGS. 1 and 2 are explanatory of how data is written on a bidirectional, multitrack magnetic tape of the belt driven tape cartridge according to the invention. With reference first and in particular to FIG. 1, which shows the beginning part of the tape, it will not noted that the tape 7 has twenty nine parallel record tracks $T_0$–$T_{25}$ extending longitudinally thereof. Of these, fifteen even numbered tracks $T_0$, $T_2$, $T_4$, $T_6$, $T_8$, $T_{10}$, $T_{12}$, $T_{14}$, $T_{16}$, $T_{18}$, $T_{20}$, $T_{22}$, $T_{24}$, $T_{26}$ and $T_{28}$ are forward tracks, that is, the tracks on which data is written during forward tape travel from the beginning, shown directed to the left in FIG. 1, to the end, shown directed to the right in FIG. 2, of the tape 7. All these forward tracks are disposed on the top half, as seen in FIGS. 1 and 2, of the tape.

The other, odd numbered tracks $T_1$, $T_3$, $T_5$, $T_7$, $T_9$, $T_{11}$, $T_{13}$, $T_{15}$, $T_{17}$, $T_{19}$, $T_{21}$, $T_{23}$, $T_{25}$ and $T_{27}$ are reverse tracks, that is, the tracks on which data is written during reverse tape travel from the end to the beginning of the tape 7. These reverse tracks are disposed on the bottom half, as viewed in FIGS. 1 and 2, of the tape and will be later described with reference to FIG. 2.

The tape 7 is conventionally formed with a beginning-of-tape (BOT) mark 20 and a track beginning mark LP on its beginning portion shown in FIG. 1, and an end-of-tape (EOT) mark 21 and a track end mark EW on its end portion shown in FIG. 2. The BOT mark 20 is shown as six holes, the EOT mark 21 as three holes, and the track beginning and end marks LP and EW each as a single hole. All these holes are aligned longitudinally of the tape. At R in FIGS. 1 and 2 are shown conventional reference bursts which precede the forward track $T_0$ and the reverse track $T_1$ for gain control of a read amplifier in the associated tape transport.

According to the invention, in order to make utmost use of the storage capacity of the tape 7, the starting positions of the fifteen forward tracks $T_0$, $T_2$, . . . $T_{25}$ are not alike but differ between two groups. The first group $W_1$ of forward tracks $T_0$, $T_5$, $T_{24}$, $T^{18}$, $T^{10}$, $T_{16}$, $T_{22}$ and $T_{28}$, disposed adjacent the longitudinal centerline of the tape 7, start in a longitudinal tape position $P_1$ spaced a first preassigned distance $L_1$ from the last hole position $P_0$ of the BOT mark 20. The second group $W_2$ of forward tracks $T_4$, $T_{14}$, $T_{26}$, $T_{20}$, $T_{12}$, $T_6$ and $T_2$, disposed adjacent one longitudinal edge 22 of the tape 7, start in another longitudinal tape position $P_2$ spaced a second preassigned distance $L_2$ from the BOT mark position $P_0$. The first distance $L_1$ is less than the second distance $L_2$.

It will be noted from FIG. 2 that all the forward tracks $T_0$, $T_2$, . . . $T_{28}$ end in the same longitudinal tape position. Conventionally, the starting positions of the forward tracks were all at $P_2$. It will therefore be appreciated that the first group of forward tracks $T_0$, $T_8$, . . . $T_{25}$ are longer than heretofore by $L_2$ minus $L_1$.

As will be understood from FIG. 2, the starting positions of the fourteen reverse tracks $T_1$, $T_3$, $T_5$, $T_7$, $T_9$, $T_{11}$, $T_{13}$, $T_{15}$, $T_{17}$, $T_{19}$, $T_{21}$, $T_{23}$, $T_{25}$ and $T_{27}$ are also not alike but differ between two groups. The first group $W_3$ of reverse tracks $T_1$, $T_{13}$, $T_3$, $T_{21}$, $T_{15}$, $T_{25}$ and $T_{19}$, disposed adjacent the longitudinal centerline of the tape 7, start in a longitudinal tape position $P_4$ spaced a third preassigned distance $L_3$ from the EOT mark position $P_3$. The second group $W_4$ of reverse tracks $T_9$, $T_{17}$, $T_{23}$, $T_5$, $T_{27}$, $T_7$ and $T_{11}$, disposed adjacent another longitudinal edge 23 of the tape 7, start in another longitudinal tape position $P_5$ spaced a fourth preassigned distance $L_4$ from the EOT mark position $P_3$. The third distance $L_3$ is less than the fourth distance $L_4$.

A reference back to FIG. 1 will reveal that all the reverse tracks $T_1$, $T_3$, . . . $T_{27}$ end in the same longitudinal tape position. The starting positions of the reverse tracks were all at $P_5$, so that the first group of reverse tracks $T_1$, $T_{13}$, . . . $T_{19}$ are longer than heretofore by $L_4$ minus $L_3$.

The belt driven tape cartridge, including the tape 7 of the foregoing track arrangement, is suitable for use with a tape transport including a bidirectional, combined read/write head and associated electronics diagramed in FIG. 3. At 19 in this figure is shown the read/write head comprising a forward write gap 24, forward read gap 25, reverse write gap 26, reverse read gap 27 and erase gap 28. The forward and reverse write windings, not shown, are connected to a write circuit 29; the forward and reverse read windings, not shown, to a read circuit 30; and the erase winding, not shown, to an erase circuit, not shown.

The write circuit 29 and read circuit 30 are both connected to a controller 31 which may take the form of a programmable microprocessor in practice. The controller 31 receives data to be written from a computer system over a bus 32. Also connected to the controller 31 is a BOT/EOT sensor 33 which senses the BOT mark 20 and track beginning mark LP of FIG. 1 and the EOT mark 21 and track end mark EW of FIG. 2.

Thus, receiving the output from the BOT/EOT sensor 33, the controller 31 times the delivery of the computer data to the write circuit 29 for causing such data to be written on the tape 7 by the head 19 according to the teachings of this invention illustrated in FIGS. 1 and 2. The head 19 is movable from one track to another across the tape 7 as a lead screw 35 is driven by an electric stepper motor 36. This motor is controlled by a motor control circuit 36 which in turn is under the control of the controller 31.

Typically, the extensions ($L_2$–$L_1$) of the first group $W_1$ of forward tracks and the extensions ($L_4$–$L_3$) of the first group $W_3$ of reverse tracks, both gained by the novel writing method of this invention, are each 711.2 centimeters (280 inches) long. Additional data of 3,429,916 bits, or 428,739.5 bytes, can be stored on each of these track extensions if such data is recorded at a rate of 12,249.7 bytes per inch. Since there are fifteen such track extensions in the case under consideration, the total amount of data that can be stored thereon is as much as 6.4 megabytes.

The present applicant's experiment has proved that the commencement of writing on the first group $W_1$ of forward tracks in the tape position $P_1$ and on the first group $W_3$ of reverse tracks in the tape position $P_4$ results in no inconvenience at all. What follows is an explanation of why these tracks can be made longer than heretofore.

Tape tension is not sufficiently high at the tape portion $P_1$–$P_2$ during forward tape travel and at the tape portion $P_4$–$P_5$ during reverse tape travel in the two-reel, belt driven tape cartridge in question. However, the midparts of these tape portions with respect to the transverse direction of the tape, where the extensions of the first group $W_1$ of forward tracks and the first group $W_3$ of reverse tracks are recorded, are hardly subject to destruction or deformation. Therefore, being in good contact with the gapped surface of the head 19, the midparts of the tape have proved to give rise to little or no errors if data is written thereon.

The opposite longitudinal edge parts of the tape are more susceptible to destruction or deformation throughout its length. Errors are more liable to occur on these tape parts if the tape tension is insufficient. One reason for such destruction or deformation is the way in which the drive belt of the tape cartridge contacts the tape on the reel hubs. The driving belt has a flat belt, with a width considerably less than that of the tape, and contacts only the midpart of the tape with respect to its transverse direction. The tape is therefore susceptible to deformation along the borders between its midpart and its opposite edge portions. The borders are contained in the tape portions where the second group $W_2$ of forward tracks and the second group $W_4$ of reverse tracks are recorded.

Another reason for the destruction or deformation of the edge parts of the tape is the way in which the tape contacts two or three tape guide pins which in combination define a tape guide path between the reel hubs. The guide pins are flanged, so that the tape is easy to suffer deformation along its edge portions on riding over the flanges. The tape edge portions are all the more subject to deformation because the tape tension is the highest at its midpart, with respect to its transversedirection, and grows less toward its opposite edges.

For the foregoing reasons the edge portions of the tape may corrugate or curl away from the transducer when the tape tension is too low. No such deformation will occur, however, if the tape tension is sufficiently high. Reading or writing of data on the second group $W_2$ of forward tracks and the second group $W_4$ of reverse tracks with little or no errors becomes possible when the tape comes to the position $P_2$ during forward travel and to the position $P_5$ during reverse travel.

The midpart of the tape is far more free from destruction or deformation than its edge portions. Consequently, no more errors are to occur if data is started to be written if writing is started on the first group $W_1$ of forward tracks in the tape position $P_1$ and on the first group $W_3$ of reverse tracks in the tape position $P_4$ than if, as is conventional in the art, writing is started on such tracks in the tape positions $P_2$ and $P_5$.

Despite the foregoing detailed disclosure, it is not desired that the present invention be limited by the exact showing of the drawings or the description thereof. For example, the forward and/or reverse tracks on the tape may be divided into three or more groups, instead of two as in the exemplified embodiment of the invention. The starting positions $P_1$, $P_2$, $P_3$ and $P_4$ of the forward and reverse tracks may be determined on the bases of the track beginning mark LP and track end mark EW, instead of the BOT mark 20 and EOT mark 21. Also, in the case of magnetic tapes having transparent unmagnetized zones and opaque magnetized zones, the boundaries between such zones may be relied upon for the determination of the starting positions of the tracks.

All these and other modifications, alterations or adaptations of the invention are intended in the foregoing disclosure. It is therefore appropriate that the invention be construed broadly and in a manner consistent with the fair meaning or proper scope of the attached claims.

What is claimed is:

1. In a bidirectional tape transport system for use with a two-reel, multitrack tape cartridge, wherein the tension of magnetic tape traveling past a transducer increases from the beginning toward the end-of-the tape during forward tape travel, and from the end toward the beginning-of-the tape during reverse tape travel, and wherein the tape has a beginning-of-tape mark located near the physical beginning-of-the tape, and an end of tape mark located near the physical end-of-the tape, a method of bidirectionally writing data on the tape along a plurality of forward tracks and a plurality of reverse tracks, both forward and reverse tracks extending longitudinally along the tape, which method comprises the steps of:

(a) pre-dividing the forward tracks on the tape into a first group adjacent to a longitudinal centerline of the tape and a second group adjacent to one longitudinal edge of the tape, and the reverse tracks on the tape into a third group adjacent to the centerline of the tape and a fourth group adjacent to another longitudinal edge of the tape;

(b) sensing the beginning-of-the tape mark;

(c) writing along each of the first group of forward tracks from a first position spaced a first predetermined distance from the beginning-of-the tape mark to a forward track position located near physical end-of-the tape during forward tape travel;

(d) writing along each of the second group of tracks from a second position spaced a second predetermined distance which is greater than the first predetermined distance from the beginning-of-the tape mark to the forward track end position in the same manner as the first group of the forward tracks during the forward tape travel;

(e) sensing the end-of-the tape mark;

(f) writing along each of the third group of reverse tracks from a third position spaced a third predetermined distance from the end-of-the tape mark to the reverse track end position located near the physical beginning-of-the tape during reverse tape travel; and (g) writing along each of the fourth group of reverse tracks from a fourth position spaced from the marked end a fourth predetermined distance from the end-of-the tape mark to the reverse track end position in the same manner as the third group of reverse tracks during reverse tape travel;

whereby the tape defines a greater storage area than the first and second groups of forward tracks from the second position to the forward track end position as well as the third and fourth groups of reverse tracks from the fourth position to the reverse track end position.

2. A bidirectional, multitrack magnetic tape comprising;

a beginning-of-tape mark located near the physical beginning-of-the tape;

an end-of-tape mark located near the physical end-of-the tape;

a first group of forward tracks adjacent a longitudinal centerline of the tape, a second group of forward tracks adjacent one longitudinal edge of the tape, a third group of reverse tracks adjacent the centerline of the tape, and a fourth group of reverse tracks adjacent another longitudinal edge of the tape, a first position spaced a first predetermined distance from the beginning-of-tape mark, a second position spaced a second predetermined distance which is greater than the first predetermined distance from the beginning-of-tape mark, a third position spaced a third predetermined distance from the end-of-tape mark, a fourth position spaced a fourth predetermined distance which is greater than the third predetermined distance from the end-of-tape mark, data that has been written along each of the first group of forward tracks from the first position to the forward track end position located along each of the second group of forward tracks from the second position to the forward track end position in the same manner as the first group of forward tracks, along each of the third group of reverse tracks from the third position to a reverse track end position, and along each of the fourth group of reverse tracks from the fourth position to the reverse track end position in the same manner as the first group of reverse tracks;

whereby the tape defines a greater storage area than the first and second groups of forward tracks from the second position to the forward track end position as well as the third and fourth groups of reverse tracks from the fourth position to the reverse track end position.

* * * * *